United States Patent
Kato

(10) Patent No.: US 10,643,774 B2
(45) Date of Patent: May 5, 2020

(54) VIBRATION GENERATION DEVICE AND INPUT DEVICE WITH VIBRATION MECHANISM

(71) Applicant: ALPINE ELECTRONICS, INC., Tokyo (JP)

(72) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 150 days.

(21) Appl. No.: 15/901,263

(22) Filed: Feb. 21, 2018

(65) Prior Publication Data

US 2018/0336985 A1 Nov. 22, 2018

(30) Foreign Application Priority Data

May 18, 2017 (JP) ................... 2017-098858

(51) Int. Cl.
*H01F 5/00* (2006.01)
*H01F 7/16* (2006.01)
(Continued)

(52) U.S. Cl.
CPC ............. *H01F 7/1607* (2013.01); *G08B 6/00* (2013.01); *H01F 7/064* (2013.01); *H01F 7/081* (2013.01);
(Continued)

(58) Field of Classification Search
CPC .......... H01F 7/064; H01F 7/081; H01F 7/086; H01F 7/1607; G08B 6/00; G06F 3/01;
(Continued)

(56) References Cited

U.S. PATENT DOCUMENTS

| 5,572,922 | A | * | 11/1996 | Moon | ................... | F04B 17/046 |
| | | | | | | 92/181 P |
| 6,515,565 | B1 | * | 2/2003 | Muramatsu | ............... | G10F 1/02 |
| | | | | | | 335/282 |

(Continued)

FOREIGN PATENT DOCUMENTS

| JP | 14-107804 | 4/1992 |
| JP | 2013-128367 | 6/2013 |
| JP | 2015-230620 A | 12/2015 |

OTHER PUBLICATIONS

U.S. Appl. No. 15/896,525, filed Feb. 14, 2018, Kato.

*Primary Examiner* — Shawki S Ismail
*Assistant Examiner* — Lisa N Homza
(74) *Attorney, Agent, or Firm* — Brinks Gilson & Lione

(57) ABSTRACT

A vibration generation device includes a plunger and a solenoid. The plunger includes a weight portion, a first biasing portion extending from the weight portion along a first direction and a second biasing portion extending from the weight portion along a second direction opposite to the first direction. The solenoid includes a first solenoid that is disposed so as to surround a part of the first biasing portion and operates the plunger in the first direction, and a second solenoid that is disposed so as to surround a part of the second biasing portion and operates the plunger in the second direction. The first solenoid and the second solenoid have a fixing portion for a vibration target, and the weight portion reciprocates between the first solenoid and the second solenoid to vibrate the vibration target.

11 Claims, 6 Drawing Sheets

(51) Int. Cl.
*H01F 7/08* (2006.01)
*G08B 6/00* (2006.01)
*H01F 7/06* (2006.01)
*H02K 33/12* (2006.01)

(52) U.S. Cl.
CPC ....... *H02K 33/12* (2013.01); *H01F 2007/086* (2013.01); *H01F 2007/1692* (2013.01)

(58) Field of Classification Search
CPC ... G06F 3/0354; G06F 3/016; G06F 2203/014
USPC ......................................................... 335/266
See application file for complete search history.

(56) References Cited

U.S. PATENT DOCUMENTS

| | | | | |
|---|---|---|---|---|
| 8,390,218 | B2* | 3/2013 | Houston | A63F 13/06 |
| | | | | 318/114 |
| 2004/0056743 | A1* | 3/2004 | Maruhashi | F02N 15/063 |
| | | | | 335/126 |
| 2005/0173664 | A1* | 8/2005 | Ogawa | G05D 16/2022 |
| | | | | 251/129.08 |
| 2010/0018378 | A1* | 1/2010 | Takigawa | G10H 1/346 |
| | | | | 84/171 |
| 2010/0033030 | A1* | 2/2010 | Amemiya | H02K 7/1876 |
| | | | | 310/12.16 |
| 2010/0033066 | A1* | 2/2010 | Murata | H02K 7/14 |
| | | | | 310/68 R |
| 2010/0044172 | A1* | 2/2010 | Jee | F16F 9/464 |
| | | | | 188/266.5 |
| 2012/0232780 | A1* | 9/2012 | Delson | A63F 13/06 |
| | | | | 701/400 |
| 2015/0211164 | A1* | 7/2015 | Kim | D06F 39/14 |
| | | | | 68/133 |
| 2015/0357132 | A1 | 12/2015 | Ishikawa et al. | |
| 2015/0363014 | A1* | 12/2015 | Wang | G06F 3/167 |
| | | | | 345/157 |
| 2016/0144404 | A1* | 5/2016 | Houston | B06B 1/166 |
| | | | | 318/114 |
| 2016/0186707 | A1* | 6/2016 | Sakamoto | F02M 63/0049 |
| | | | | 417/505 |
| 2016/0186741 | A1* | 6/2016 | Sakamoto | F02M 63/0049 |
| | | | | 417/290 |
| 2016/0258758 | A1* | 9/2016 | Houston | G01C 21/20 |
| 2016/0274665 | A1* | 9/2016 | Wakuda | B06B 1/0207 |
| 2017/0063212 | A1* | 3/2017 | Yano | B06B 1/045 |
| 2017/0082099 | A1* | 3/2017 | Takagawa | F02D 41/2464 |
| 2017/0089483 | A1* | 3/2017 | Aihara | F16K 31/0606 |
| 2017/0102090 | A1* | 4/2017 | Kang | F16K 31/0606 |
| 2017/0143900 | A1* | 5/2017 | Rioux | A61M 5/1723 |
| 2017/0211558 | A1* | 7/2017 | Zhang | F02D 41/3082 |
| 2017/0276208 | A1* | 9/2017 | Kim | B60K 5/1283 |
| 2017/0292468 | A1* | 10/2017 | Lee | F02D 41/3005 |
| 2017/0298915 | A1* | 10/2017 | Asayama | F04B 17/042 |
| 2018/0156152 | A1* | 6/2018 | Natori | F02D 41/20 |
| 2018/0172478 | A1* | 6/2018 | Sugawara | G01B 7/00 |
| 2018/0216690 | A1* | 8/2018 | Yamashita | F16F 9/348 |
| 2018/0257622 | A1* | 9/2018 | Saito | B60T 8/34 |
| 2018/0265060 | A1* | 9/2018 | Maruo | B60T 8/368 |
| 2018/0299959 | A1* | 10/2018 | Kato | G06F 3/0416 |
| 2018/0339684 | A1* | 11/2018 | Takeya | F16K 31/06 |
| 2019/0305337 | A1* | 10/2019 | Hatakeda | H01M 8/04201 |
| 2019/0358769 | A1* | 11/2019 | Miyazawa | B24B 47/12 |

* cited by examiner

VIBRATION GENERATION DEVICE AND INPUT DEVICE WITH VIBRATION MECHANISM

RELATED APPLICATION

The application claims priority to Japanese Patent Application Number 2017-098858, filed May 18, 2017, the entirety of which is hereby incorporated by reference.

BACKGROUND

The present disclosure relates to a vibration generation device using a solenoid, and an input device with a vibration mechanism provided with the vibration generation device.

BRIEF SUMMARY

In recent years, there are an increasing number of input devices that can perform an input operation by touching an operation surface like a touch panel. In such an input device, in order to improve operability, there is a demand for an input device with a vibration mechanism in which a pseudo operation feel can be felt by applying vibration to the operation surface when the input device is operated.

As an example of a vibration mechanism that can be used for such an input device or the like, disclosed in JP 2013-128367 A, includes a vibration device using a movable iron core and a solenoid, in which a movable iron core movable in a fixed direction is provided inside a first solenoid that resonates with the movable iron core and is continuously excited with a constant current, and solenoids for vibration urging are disposed side by side on one side or both sides of the first solenoid in a movable iron core moving direction.

SUMMARY

The solenoid shown in JP 2013-128367 A is simple; however, since the movable iron core that greatly affects the amount of generated vibration energy moves in a hollow portion of the solenoid, in order to increase the vibration energy, it is necessary to enlarge the hollow portion of the solenoid so that a large movable iron core can be moved. As a result, the entire vibration device tends to become large and tends to be difficult to use as a vibration mechanism of an input device such as a touch panel.

In view of the above situation, an object of the present disclosure is to provide a vibration generation device capable of generating a large vibration while being easily miniaturized with a simple configuration, and an input device with a vibration mechanism provided with the vibration generation device.

In order to solve the above problem, the present disclosure provides, in one aspect, a vibration generation device including a plunger and a solenoid. The plunger includes a weight portion, a first biasing portion extending from the weight portion along a first direction and a second biasing portion extending from the weight portion along a second direction opposite to the first direction. The solenoid includes a first solenoid that is disposed so as to surround a part of the first biasing portion and operates the plunger in the first direction, and a second solenoid that is disposed so as to surround a part of the second biasing portion and operates the plunger in the second direction. The first solenoid and the second solenoid have a fixing portion for a vibration target, and the weight portion reciprocates between the first solenoid and the second solenoid to vibrate the vibration target.

Since the weight portion connected to the movable core (the first biasing portion and the second biasing portion) of each solenoid is provided between the two solenoids that are disposed to be separated from each other, it is possible to adjust the vibration energy and natural frequency by changing the shape of the weight portion to change the mass of the plunger. That is, it is possible to change the mass of the plunger as a whole, without changing the size of the plunger entering the solenoid, particularly the outer diameter of the biasing portion (the first biasing portion and the second biasing portion). Therefore, it is possible to increase the vibration generated from the vibration generation device without particularly increasing the size of the solenoid.

It is preferable that the vibration generation device further includes a first elastic member located between the first solenoid and the weight portion, and a second elastic member located between the second solenoid and the weight portion, wherein the first solenoid cooperates with the second elastic member to move the plunger in the first direction, and the second solenoid cooperates with the first elastic member to move the plunger in the second direction. A suction force of the plunger by the first solenoid increases toward the first direction. A suction force of the plunger by the second solenoid increases toward the second direction. Therefore, an initial force that has moved the plunger in the second direction by the second solenoid from a state where the plunger is at the limit position on the first direction side is lower than a suction force in the second direction in a state after the plunger has moved to some extent in the second direction. Therefore, there is a limit to moving the plunger at a high speed between the first solenoid and the second solenoid by only a suction force of the solenoid.

Therefore, the first elastic member is disposed between the first solenoid and the weight portion, and the first elastic member is compressed as the plunger moves to the limit position on the first direction side. With this configuration, when the plunger is about to move in the second direction from the limit position on the first direction side, in addition to the relatively low suction force by the second solenoid at this position, the plunger can be moved in the second direction also by an elastic recovery force of the first elastic member. The same applies to the second elastic member, and by disposing the second elastic member between the second solenoid and the weight portion, when the plunger at the limit position on the second direction side moves in the first direction, the elastic recovery force of the second elastic member compensates for the suction force by the plunger, more specifically, the first biasing portion, and high speed movement is realized. If the extension lengths of the first elastic member and the second elastic member are appropriately set, it is also possible to hold the neutral position of the plunger with these elastic members in a state where both the first solenoid and the second solenoid are stopped.

In the case of having the elastic member, it is preferable that the natural frequency of a spring system by the first solenoid and the plunger and the natural frequency of the spring system by the second elastic member and the plunger are in harmony. When the plunger is about to move in the first direction from the limit position on the second direction side, the suction force by the first solenoid and the elastic recovery force of the second elastic member act on the plunger, as described above. Therefore, since the natural frequency of a spring system by the first solenoid and the plunger and the natural frequency of a spring system by the second elastic member and the plunger are in harmony, it is possible to efficiently cause the plunger to move in the first direction. Similarly, since the natural frequency of a spring system by the second solenoid and the plunger and the natural frequency of a spring system by the first elastic member and the plunger are in harmony, it is possible to efficiently cause the plunger to move in the second direction.

In the vibration generation device, a natural frequency of a spring system for moving the plunger in the first direction and a natural frequency of the spring system for moving the plunger in the second direction are preferably in harmony. In this way, by harmonizing the natural frequency of the movement moving in the first direction and the natural frequency of the movement moving in the second direction, the entire vibration generation device can be vibrated efficiently at a predetermined natural frequency; therefore, high vibration energy can be generated.

The vibration generation device may include a first damper portion provided between the first solenoid and the weight portion, configured to alleviate movement of the plunger in the first direction, and a second damper portion provided between the second solenoid and the weight portion, configured to alleviate movement of the plunger in the second direction. In the above vibration generation device, since the spring system performing the movement in the first direction and the spring system performing the movement in the second direction are different, it is preferable that the operation by the spring system performing the movement in the first direction when the movement in the first direction is completed is terminated promptly from the viewpoint of efficiently operating the spring system performing the movement in the second direction. Similarly, when the predetermined movement is completed and the movement in the next first direction is started, the movement in the second direction also does not affect the movement in the first direction. That is, when the damper portions are provided between the first solenoid and the weight portion and between the second solenoid and the weight portion, respectively, and the plunger reaches the limit position in the first direction or the limit position in the second direction, it is preferable to promptly attenuate a force for moving the plunger by the spring system including the respective solenoids from the viewpoint of stable operation of the vibration generation device.

Another aspect of the present disclosure provides an input device with a vibration mechanism including: an operation portion capable of performing an input operation by an operator; a vibration generation unit that generates vibration with respect to the operation portion; and a control unit that controls an operation of the vibration generation unit; wherein the vibration generation unit includes the vibration generation device, and the operation portion is fixed to the first solenoid and the second solenoid of the vibration generation device.

The input device with a vibration mechanism having such a configuration has the above-described vibration generation device capable of generating strong vibration while having a simple configuration as a vibration mechanism, so that vibration giving the operator a sharp and strong operation feeling can be generated at the operation portion.

In the above input device with a vibration mechanism, the vibration generation unit may be separated from the operation portion, and the vibration generation unit and the operation portion may be fixed via a bracket. Since the vibration generation unit is separated from the operation portion, the degree of freedom in designing the input device can be increased, and it is possible to easily respond to a high demand such as an increase in size and thinning of the input device.

According to the present disclosure, a vibration generation device capable of generating a large vibration while being easily miniaturized with a simple configuration, and an input device with a vibration mechanism provided with the vibration generation device are provided.

BRIEF DESCRIPTION OF THE DRAWINGS

FIGS. 2A to 2D are cross-sectional views for explaining the operation of the vibration generation device of FIG. 1A, in which FIG. 2A is a sectional view showing a state in which the plunger is at a limit position on a first direction side, FIG. 2B is a sectional view showing a state in which the plunger moves from the state of FIG. 2A to a second direction side and passes through a neutral position, FIG. 2C is a sectional view showing a state in which the plunger is at a limit position on the second direction side, and FIG. 2D is a cross-sectional view showing a state in which the plunger moves from the state of FIG. 2A to the second direction side and passes through the neutral position;

FIGS. 4A and 4B are external views of an input device with a vibration mechanism according to one embodiment of the present disclosure, in which FIG. 4A is an external view from a direction in which an operation surface can be visually recognized, and FIG. 4B is an external view from a direction in which a back surface of the operation portion can be visually recognized;

DETAILED DESCRIPTION OF THE DRAWINGS

Figure 1A:
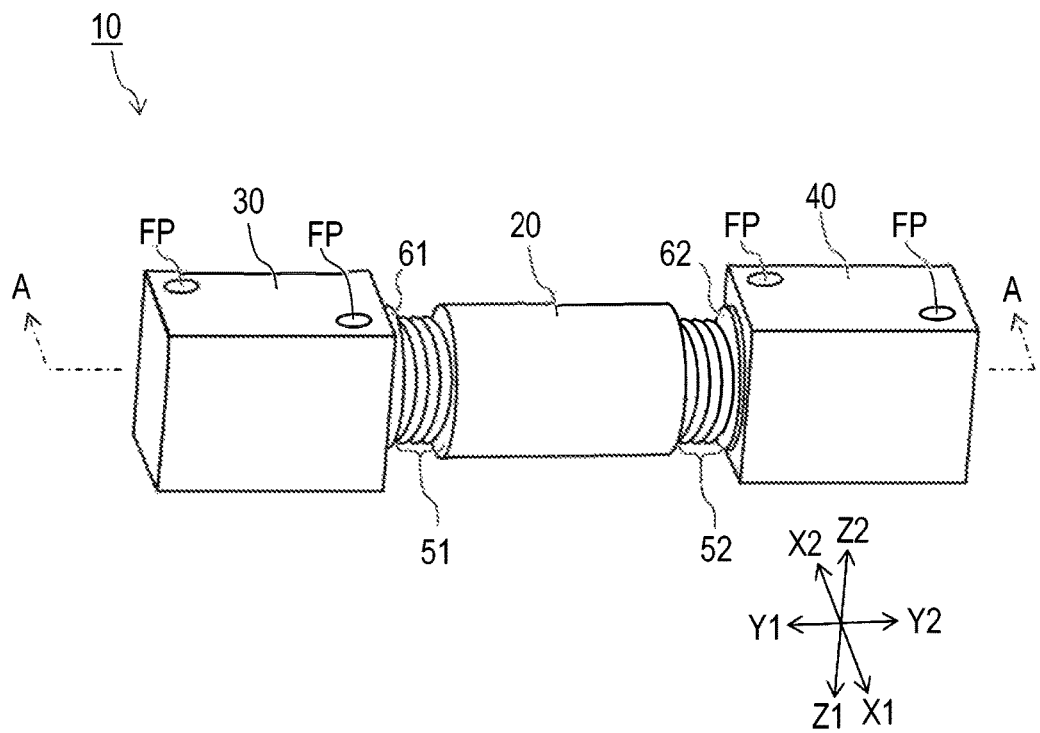
FIG. 1A is an external view showing a vibration generation device according to one embodiment of the present disclosure.
Figure 1B:
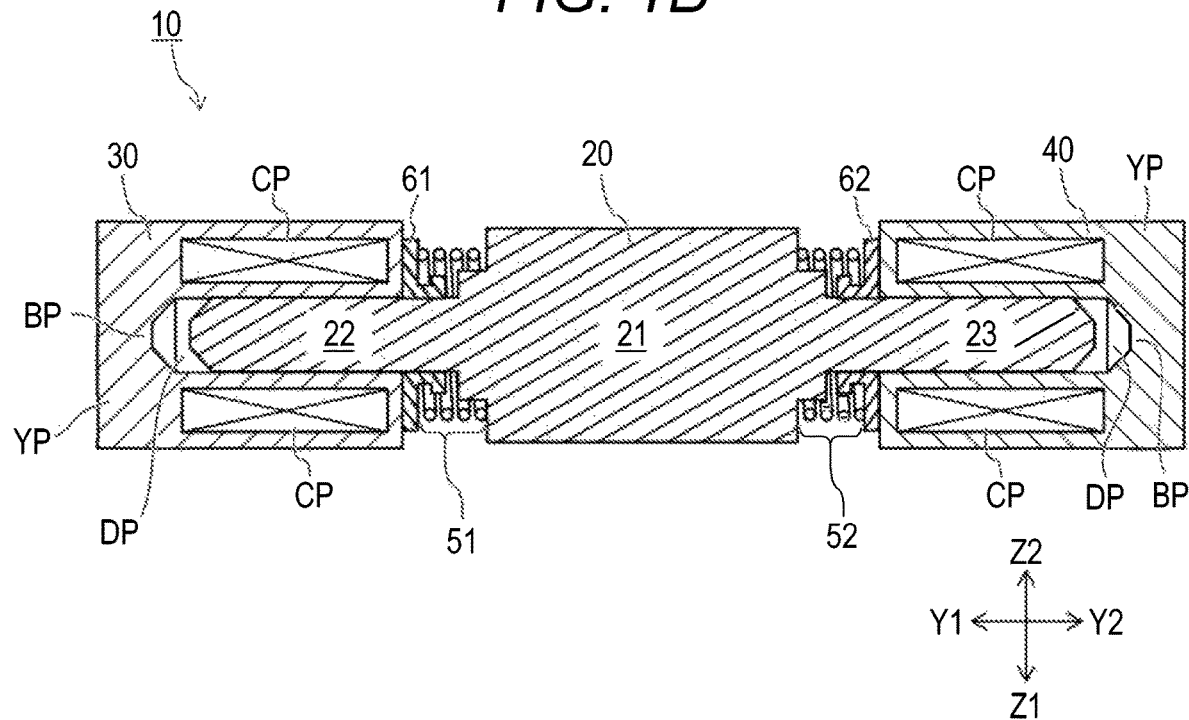
FIG. 1B is a sectional view taken along line A-A in FIG. 1A.

Hereinafter, embodiments of the present disclosure will be described with reference to the drawings. FIG. 1A is an external view showing a vibration generation device according to one embodiment of the present disclosure. FIG. 1B is a cross-sectional view taken along line A-A of FIG. 1A.

As shown in FIG. 1A, a vibration generation device 10 according to one embodiment of the present disclosure is a vibration generation device using a plunger 20 and two solenoids (a first solenoid 30 and a second solenoid 40).

As shown in FIG. 1B, the plunger 20 includes a cylindrical weight portion 21, a rod-like first biasing portion 22 extending in a first direction (Y1-Y2 direction Y1 direction) from the center of one bottom surface (bottom surface in a Y1-Y2 direction Y1) of the cylindrical weight portion 21 and a second biasing portion 23 extending along a second direction (Y1-Y2 direction Y2 direction) opposite to the first direction (Y1-Y2 direction Y1 direction) from the center of the other bottom surface (bottom surface on a Y1-Y2 direction Y2 side) of the cylindrical weight portion 21. That is, the plunger 20 has a rod-like structure extending in the Y1-Y2 direction as a whole, and the outer diameter of the central portion in the extending direction (Y1-Y2 direction) is increased to form the weight portion 21. Therefore, it is possible to change the weight of the entire plunger 20 by changing the shape of the weight portion 21 without increasing the outer diameters of the first biasing portion 22 and the second biasing portion 23. In the plunger 20, at least the first biasing portion 22 and the second biasing portion 23 are made of a soft magnetic material such as silicon steel, permalloy and Fe based alloy amorphous material. Like the plunger 20 shown in FIG. 1B, it is preferable that the first biasing portion 22 and the second biasing portion 23 are disposed coaxially (specifically, along the Y1-Y2 direction) from the viewpoint of miniaturization of the vibration generation device 10.

The two solenoids include the first solenoid 30 disposed so as to surround a part of the first biasing portion 22 and causing the plunger 20 to move in the first direction (Y1-Y2 direction Y1 direction) and the second solenoid 40 disposed so as to surround a part of the second biasing portion 23 and causing the plunger 20 to move in the second direction (Y1-Y2 direction Y2 direction). Each of the solenoids (the first solenoid 30 and the second solenoid 40) has a recessed portion DP into which the biasing portion (the first biasing portion 22 and the second biasing portion 23) is inserted, and a coil CP is wound around this recessed portion.

In each of the two solenoids (the first solenoid 30 and the second solenoid 40), a yoke YP made of a soft magnetic material is provided so as to cover the coil CP and to be positioned on a bottom portion BP side (in the Y1-Y2 direction Y1 side in the case of the first solenoid 30 and in the Y1-Y2 direction Y2 side in the case of the second solenoid 40) of the recessed portion DP. The material constituting the yoke YP may be the same as those of the biasing portions (the first biasing portion 22 and the second biasing portion 23). Since the coil CP and the yoke YP are disposed in this manner, a force for attracting the biasing portions (the first biasing portion 22 and the second biasing portion 23) by the solenoids (the first solenoid 30 and the second solenoid 40) becomes the maximum at the bottom portion BP of the recessed portion DP, so that the force becomes smaller as the square of the separation distance from the bottom BP.

Each of the two solenoids (the first solenoid 30 and the second solenoid 40) is provided with a fixing portion FP (shown as a screw hole in FIG. 1A) with respect to a vibration target. In use, the weight portion 21 reciprocates in the Y1-Y2 direction between the first solenoid 30 and the second solenoid 40, thereby making it possible to vibrate the vibration target. The specific shape of the fixing portion FP is not limited as long as the fixing portion FP is mechanically connected to the vibration target and can transmit the vibration from the vibration generation device 10 to the vibration target. The fixing portion FP may be a through hole through which a bolt can be inserted or a screw thread may be provided on the fixing portion FP. When the vibration generation device 10 is fixed to the vibration target by welding, the portion including the welded portion becomes the fixing portion FP. Further, the vibration target may be directly fixed to the fixing portion FP, or the vibration target may be fixed via a connecting member such as a bracket described later.

As described above, since the plunger 20 can change its mass according to the shape of the weight portion 21 without changing the outer diameter of the biasing portion (the first biasing portion 22 and the second biasing portion 23), the increase in the mass of the plunger 20 does not directly lead to an increase in the outer diameter of the solenoid (the first solenoid 30 and the second solenoid 40). An increase in the size of the solenoid not only brings about an increase in the size of the vibration generation device but also causes various troubles such as an increase in the size of the coil and an increase in heat generated during driving. As described above, in the vibration generation device 10, since the mass of the plunger 20 can be easily changed without enlarging the solenoid (the first solenoid 30 and the second solenoid 40), such troubles are less likely to occur.

In the Y1-Y2 direction, a first elastic member 51 elastically deformable in the Y1-Y2 direction is positioned between the first solenoid 30 and the weight portion 21. In the vibration generation device 10, the first elastic member 51 is formed of a coil spring that can expand and contract in the Y1-Y2 direction. A second elastic member 52 elastically deformable in the Y1-Y2 direction is positioned between the second solenoid 40 and the weight portion 21. In the vibration generation device 10, the second elastic member 52 is formed of a coil spring that can expand and contract in the Y1-Y2 direction like the first elastic member 51.

As will be described later, the first solenoid 30 can quickly move the plunger 20 in the first direction (Y1-Y2 direction Y1 direction) in cooperation with the second elastic member 52. At this time, a force acting on the plunger 20 by the first solenoid 30 is a suction force MF1, and a force acting on the plunger 20 by the second elastic member 52 is an elastic recovery force EF2. The suction force MF1 can be adjusted by the current flowing through the coil CP. The elastic recovery force EF2 can be adjusted by the elastic coefficient of the coil spring.

The second solenoid 40 can quickly move the plunger 20 in the second direction (Y1-Y2 direction Y2 direction) in cooperation with the first elastic member 51. At this time, a force acting on the plunger 20 by the second solenoid 40 is a suction force MF2, and a force acting on the plunger 20 by the first elastic member 51 is an elastic recovery force EF1. The suction force MF2 can be adjusted by the current flowing through the coil CP. The elastic recovery force EF1 can be adjusted by the elastic coefficient of the coil spring.

Figure 2A:
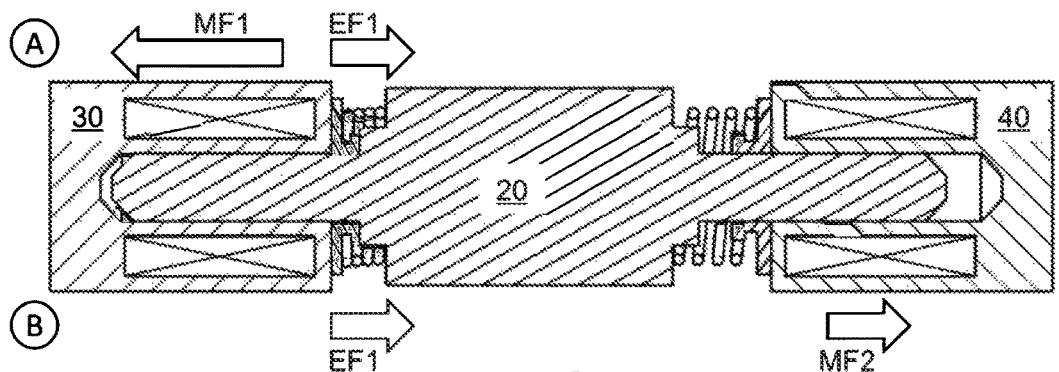

As shown in FIG. 2A, in a case where the plunger 20 is at the limit position on the first direction side (the Y1-Y2 direction Y1 side), the following two states can be taken. One of the two states is a state (state A) indicated as "A" in FIG. 3 to be described later. Regarding the force acting in the first direction (Y1-Y2 direction Y1 direction), in the first solenoid 30, the suction force MF1 is the maximum value that can be taken, and the elastic recovery force EF2 is not generated in the second elastic member 52. On the other hand, regarding the force acting in the first direction (Y1-Y2 direction Y2 direction), in the second solenoid 40, since no current flows through the coil CP, no suction force MF2 is generated and the first elastic member 51 is compressed to the maximum extent; therefore, the largest elastic recovery force EF1 is generated within the range that can be taken. Therefore, in this state, a force obtained by subtracting the elastic recovery force EF1 of the first elastic member 51 from the suction force MF1 of the first solenoid 30 is applied to the plunger 20 in the first direction (Y1-Y2 direction Y2 side). In FIG. 2A, the two arrows shown on the upper side conceptually show the two forces acting on the plunger 20 in this state A. The suction force MF1 of the first solenoid 30 is directed in the first direction (Y1-Y2 direction Y1 direction), and the elastic recovery force EF1 of the first elastic member 51 is directed in the second direction (Y1-Y2 direction Y2 direction). When comparing the absolute values of the respective forces, since the suction force MF1 is larger than the elastic recovery force EF1, these resultant forces act on the plunger 20 in the first direction.

Figure 3:
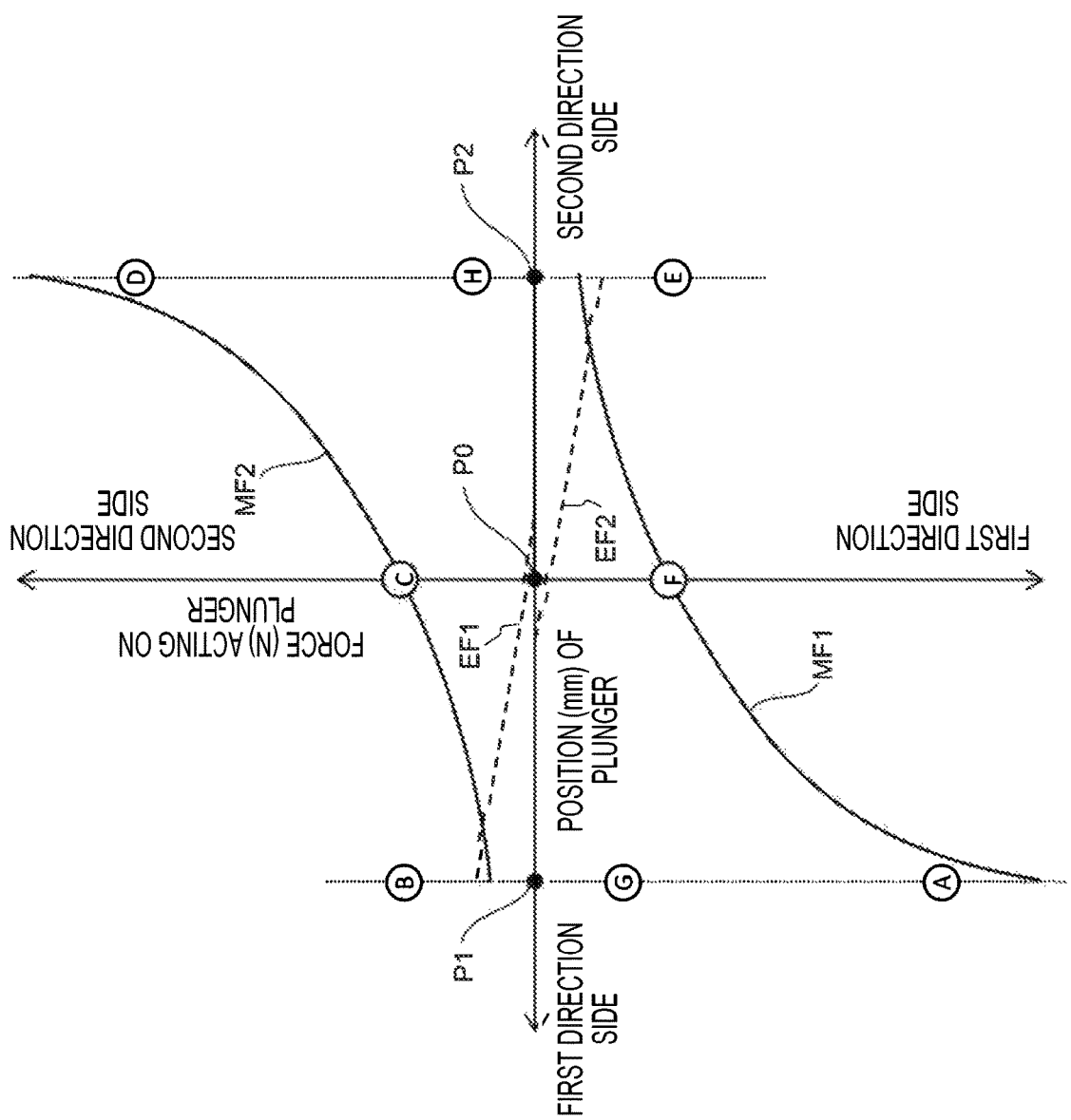
FIG. 3 is a graph for explaining the operation of the vibration generation device of FIG. 1A.

In the graph shown in FIG. 3, the horizontal axis represents the position (unit: mm) in the Y1-Y2 direction of the plunger 20, the vertical axis represents the force acting on the plunger 20 in the Y1-Y2 direction, the lower side of the vertical axis is the force (unit: N) in the first direction (Y1-Y2 direction Y1 direction), and the upper side of the vertical axis is the force in the second direction (Y1-Y2 direction Y2 direction).

The suction force MF1 of the first solenoid 30 is indicated by a solid line in FIG. 3, which is the maximum at a limit position P1 in the first direction (Y1-Y2 direction Y1 direction). As the suction force MF1 goes in the second direction (Y1-Y2 direction Y2 direction), the suction force MF1 decreases in proportion to the square of the distance from the limit position P1 in the first direction (Y1-Y2 direction Y1 direction), as a basic tendency. The suction force MF2 of the second solenoid 40 is also indicated by a solid line in FIG. 3, which is the maximum at a limit position P2 in the second direction (Y1-Y2 direction Y2 direction). As the suction force MF1 goes in the first direction (Y1-Y2 direction Y1 direction), the suction force MF2 decreases in proportion to the square of the distance from the limit position P2 in the second direction (Y1-Y2 direction Y2 direction), as a basic tendency.

The elastic recovery force EF1 of the first elastic member 51 is indicated by a broken line in FIG. 3, which is the maximum at the limit position P1 in the first direction side (Y1-Y2 direction Y1 side). As the elastic recovery force EF1 goes in the second direction (Y1-Y2 direction Y2 direction), the elastic recovery force EF1 decreases in proportion to the distance from the limit position P1 in the first direction side (Y1-Y2 direction Y1 side). The elastic recovery force EF2 of the second elastic member 52 is also indicated by a broken line in FIG. 3, which is the maximum at the limit position P2 in the first direction side (Y1-Y2 direction Y2 side). As the elastic recovery force EF2 goes in the first direction (Y1-Y2 direction Y1 direction), the elastic recovery force EF2 decreases in proportion to the distance from the limit position P2 in the second direction side (Y1-Y2 direction Y2 side). At a neutral position P0, the elastic recovery force EF1 of the first elastic member 51 and the elastic recovery force EF2 of the second elastic member 52 act on the plunger 20 with a force equal in the opposite direction. With these forces, the centroid of the plunger 20 is returned to the neutral position P0 in a no-load state in which no current flows through the coil CP of any of the two solenoids (the first solenoid 30 and the second solenoid 40)

In one of the states shown in FIG. 2A, on the plunger 20, as described above, a resultant force of the suction force MF1 of the first solenoid 30 acting in the first direction (Y1-Y2 direction Y1 direction) and the elastic recovery force EF1 of the first elastic member 51 acting in the second direction (Y1-Y2 direction Y2 direction) acts. This state is indicated by "A" in FIG. 3 (state A).

From this state A, the flow of the current to the coil CP of the first solenoid 30 is stopped, and the flow of the current to the coil CP of the second solenoid 40 is started. As a result, the suction force MF1 of the first solenoid 30 acting on the plunger 20 in the first direction (Y1-Y2 direction Y2 side) disappears. The elastic recovery force EF1 in the second direction (Y1-Y2 direction Y2 direction) by the first elastic member 51 and the suction force MF2 in the second direction (Y1-Y2 direction Y2 direction) by the second solenoid 40 MF2 act on the plunger 20. This state is indicated by "B" in FIG. 3, which is hereinafter referred to as "state B". In the state B, the force acting on the plunger 20 is a resultant force of the suction force MF2 of the second solenoid 40 and the elastic recovery force EF1 of the first elastic member 51 as described above. FIG. 2A shows, on the lower side, the force acting on the plunger 20 in the state B.

In the position shown in FIG. 2A, the plunger 20 is most distal from the second solenoid 40 in the Y1-Y2 direction. Therefore, in the state B, the suction force MF2 of the second solenoid 40 is relatively low. However, as described above, the elastic recovery force EF1 of the first elastic member 51 which is the maximum value that can be applied also acts; therefore, also in the state B, the plunger 20 can quickly move in the second direction (Y1-Y2 direction Y2 direction).

Figure 2B:
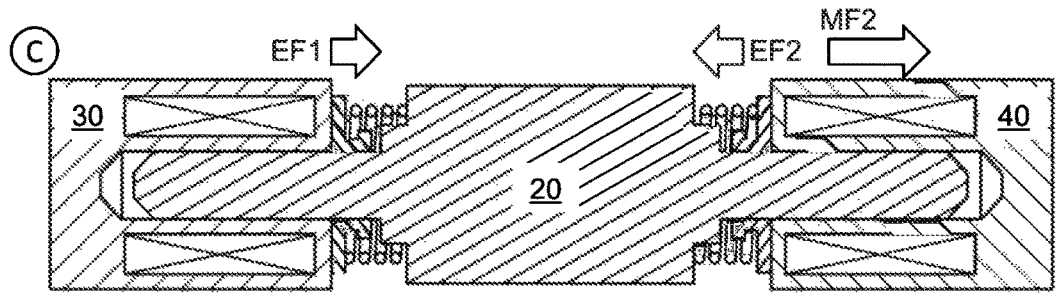

When the plunger 20 moves in the second direction (Y1-Y2 direction Y2 direction), the suction force MF2 of the second solenoid 40 increases and the elastic recovery force EF1 of the first elastic member 51 attenuates. Further, the elastic recovery force EF2 of the second elastic member 52 is generated from a position slightly shifted from the neutral position P0 in the first direction (Y1-Y2 direction Y1 direction). As described above, in the neutral position P0 shown in FIG. 2B, the elastic recovery force EF1 of the first elastic member 51 and the elastic recovery force EF2 of the second elastic member 52 are balanced; therefore, as a result, the force acting on the plunger 20 is only the suction force MF2 by the second solenoid 40, and is in a state (state C) indicated by "C" in FIG. 3.

Figure 2C:
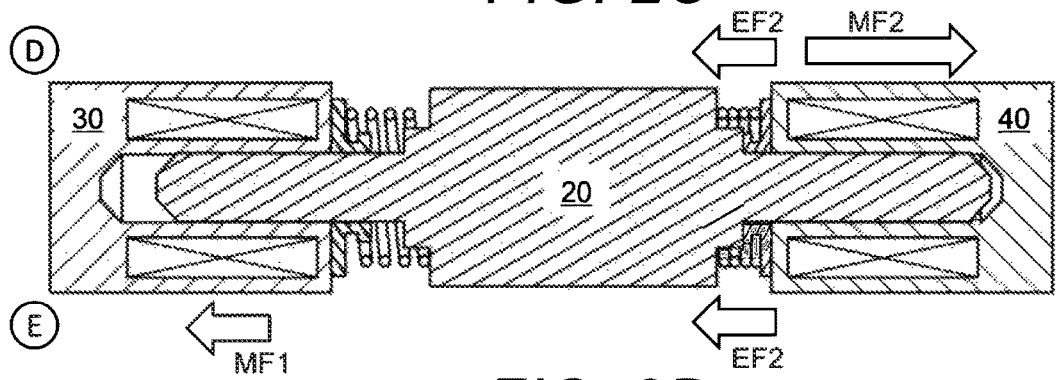

Further, when the plunger 20 moves in the second direction (Y1-Y2 direction Y2 direction), the elastic recovery force EF1 of the first elastic member 51 no longer acts on the plunger 20, the suction force MF2 of the second solenoid 40 and the elastic recovery force EF2 of the second elastic member 52 increase in opposite directions, and these resultant forces act on the plunger 20. FIG. 2C shows a state in which the plunger 20 has reached the limit position P2 on the second direction side (Y1-Y2 direction Y2 side). In FIG. 2C, the suction force MF2 of the second solenoid 40 and the elastic recovery force EF2 of the second elastic member 52 act on the upper side. This state is a state indicated by "D" in FIG. 3 (state D). When the plunger 20 moves in the second direction (Y1-Y2 direction Y2 direction) in this way, the state reaches from the state B shown in FIG. 3 through the state C to the state D.

In the state D shown in FIG. 3, when the current is stopped flowing through the coil CP of the second solenoid 40 and the current is started to flow through the coil CP of the first solenoid 30, the force acting on the plunger 20 is a resultant force of the suction force MF1 of the first solenoid 30 and the elastic recovery force EF2 of the second elastic member 52, and in FIG. 3, is in a state (state E) shown in "E". In FIG. 2C, the force acting on the plunger 20 in the state E is shown on the lower side. In the state E, the suction force MF1 of the first solenoid 30 acting on the plunger 20 is relatively low; however, since the elastic recovery force EF2 of the second elastic member 52, which is the maximum value that can be applied, also acts on the plunger 20, the force acting on the plunger 20 in the first direction (Y1-Y2 direction Y1 direction) can be increased. Therefore, in the state E, the plunger 20 can be quickly moved in the first direction (Y1-Y2 direction Y1 direction).

Figure 2D:
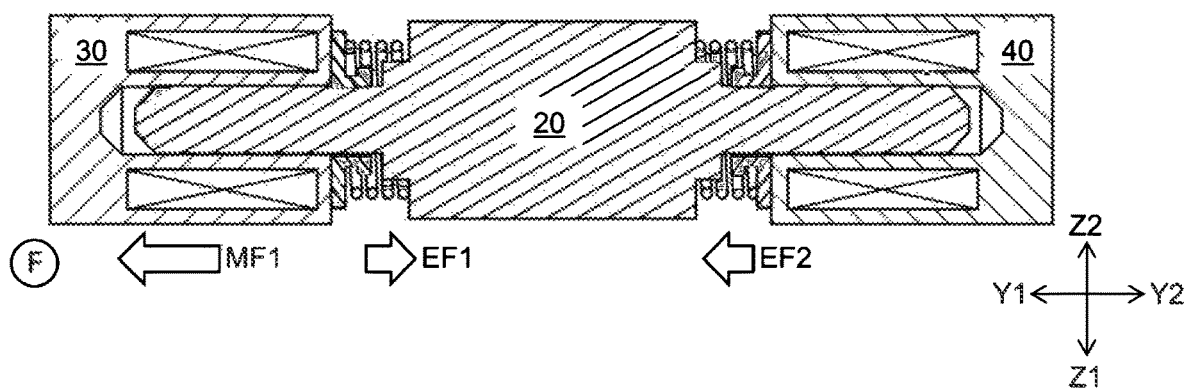

Thereafter, the plunger 20 starts to move in the first direction (Y1-Y2 direction Y1 direction), a phenomenon similar to the phenomenon from the state B to the state C occurs, and in the neutral position shown in FIG. 2D, the state E transitions to a state F. Finally, the state transitions to the state A shown in FIG. 2A, and shown in FIG. 3 as "A". When the plunger 20 moves in the first direction (Y1-Y2 direction Y1 direction) in this way, the state transitions from the state E shown in FIG. 3 through the state F to the state A.

By appropriately setting a time at which the current starts to flow through the coil CP of the first solenoid 30, a time for switching the current flowing from the coil CP of the first solenoid 30 to the coil CP of the second solenoid 40, a time for starting the flow of the current to the coil CP of the second solenoid 40, and a time for switching the current flowing from the coil CP of the second solenoid 40 to the coil CP of the first solenoid 30, the plunger 20 moves so as to include transition from the state A to the state B, movement from the state B to the state D through the state C, transition from the state D to the state E, and movement from the state E to the state A through the state F. As a result, the plunger 20 reciprocates in the Y1-Y2 direction and vibrates.

In this case, a natural frequency of a first spring system which is a spring system for moving the plunger 20 in the first direction (Y1-Y2 direction Y1 direction) and a natural frequency of the second spring system which is a spring system for moving the plunger 20 in the second direction (Y1-Y2 direction Y2 direction) are preferably in harmony.

The first spring system is defined by the first solenoid 30, the first elastic member 51, the second elastic member 52, and the plunger 20, and the natural frequency of the first spring system is set by the elastic coefficient of the first spring system and the mass of the plunger 20. Among the elastic elements constituting the first spring system, the first solenoid 30 and the second elastic member 52 are elastic elements that act when the plunger 20 starts to move from the limit position P2 on the second direction side (Y1-Y2 direction Y2 side) to the first direction (Y1-Y2 direction Y1 direction). Therefore, it is preferable that a natural frequency of a spring system by the first solenoid 30 and the plunger 20 and a natural frequency of a spring system by the second elastic member 52 and the plunger 20 are in harmony, from the viewpoint of quickly starting the movement of the plunger 20 in the first direction (Y1-Y2 direction Y1 direction).

The second spring system is defined by the second solenoid 40, the first elastic member 51, the second elastic member 52, and the plunger 20, and the natural frequency of the second spring system is set by the elastic coefficient of the second spring system and the mass of the plunger 20. Among the elastic elements constituting the second spring system, the second solenoid 40 and the first elastic member 51 are elastic elements that act when the plunger 20 starts to move from the limit position P1 on the first direction side (Y1-Y2 direction Y1 side) to the second direction (Y1-Y2 direction Y2 direction). Therefore, it is preferable that a natural frequency of a spring system by the second solenoid 40 and the plunger 20 and a natural frequency of a spring system by the first elastic member 51 and the plunger 20 are in harmony from the viewpoint of quickly starting the movement of the plunger 20 in the second direction (Y1-Y2 direction Y2 direction).

Furthermore, when the natural frequency of the first spring system and the natural frequency of the second spring system are in harmony, the operation of the first spring system and the operation of the second spring system tend to continuously occur. The plunger 20 can be strongly vibrated at a predetermined natural frequency. In the vibration generation device 10, a harmonization between the natural frequency of the first spring system and the natural frequency of the second spring system can be realized by making the structure on the Y1-Y2 direction Y1 side and the structure on the Y1-Y2 direction Y2 side as equal as possible, and equalizing the amount of current flowing to the coil CP of the first solenoid 30 and the amount of current flowing to the coil CP of the second solenoid 40.

The vibration generation device 10 further includes, as shown in FIG. 1 and the like, a first damper portion 61 provided between the first solenoid 30 and the weight portion 21, configured to alleviate the movement of the plunger 20 in the first direction (Y1-Y2 direction Y1 direction), and a second damper portion 62 provided between the second solenoid 40 and the weight portion 21, configured to alleviate the movement of the plunger 20 in the second direction (Y1-Y2 direction Y2 direction). The first damper portion 61 and the second damper portion 62 have a ring shape in which the plunger 20 is partly inserted and include a material having a large loss elastic modulus, specifically, a rubber type material or an elastomer.

In the vibration generation device 10, as described above, when the plunger 20 vibrates as shown in FIG. 3, the movement of the plunger 20 in the first direction (Y1-Y2 direction Y1 direction) is effected by the first spring system, and the movement of the plunger 20 in the second direction (Y1-Y2 direction Y2 direction) is effected by the second spring system. Therefore, in order for the plunger 20 to properly vibrate, it is preferable that a transition from the state A in which the movement by the first spring system is completed to the state B in which the movement by the second spring system starts and a transition from the state D in which the movement by the second spring system is completed to the state E in which the movement by the first spring system starts are carried out without delay.

From this viewpoint, in the first damper portion 61, by absorbing the force in the first direction (Y1-Y2 direction Y1 direction) from the state A with respect to the plunger 20, the first damper portion 61 can change to a state close to the state B (specifically, a state in which the force on the first direction side is close to zero). Illustratively, the first damper portion 61 can promptly make a transition from the state A to a state G (state shown as "G" in FIG. 3). Therefore, by providing the first damper portion 61, transition from the state A in which movement by the first spring system is completed to the state B in which movement by the second spring system starts is facilitated.

Similarly, by absorbing the force in the second direction (Y1-Y2 direction Y2 direction) from the state D, the second damper portion 62 can change to a state close to the state E (specifically, a state in which the force on the second direction side is close to zero). Illustratively, the second damper portion 62 can rapidly make a transition from the state D to a state H (state shown as "H" in FIG. 3). Therefore, by providing the second damper portion 62, transition from the state D in which movement by the second spring system is completed to the state E in which movement by the first spring system starts is facilitated.

In this way, the vibration generation device 10 includes the first damper portion 61 and the second damper portion 62, so that the vibration of the plunger 20 can be performed more stably.

Figure 4A:
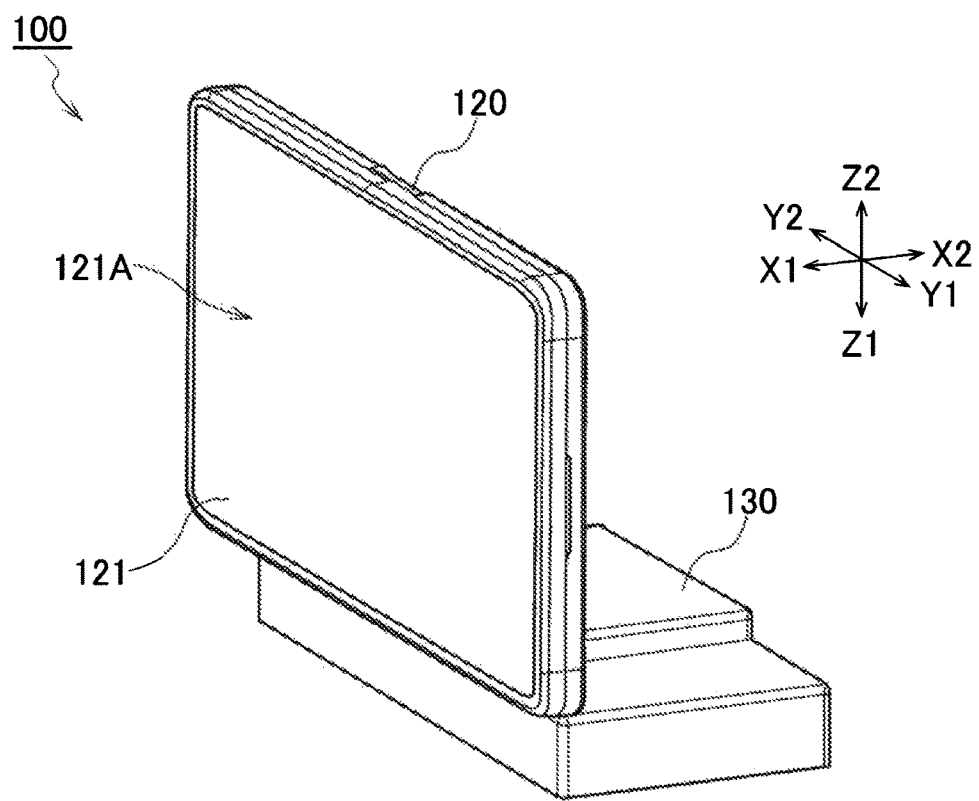
Figure 4B:
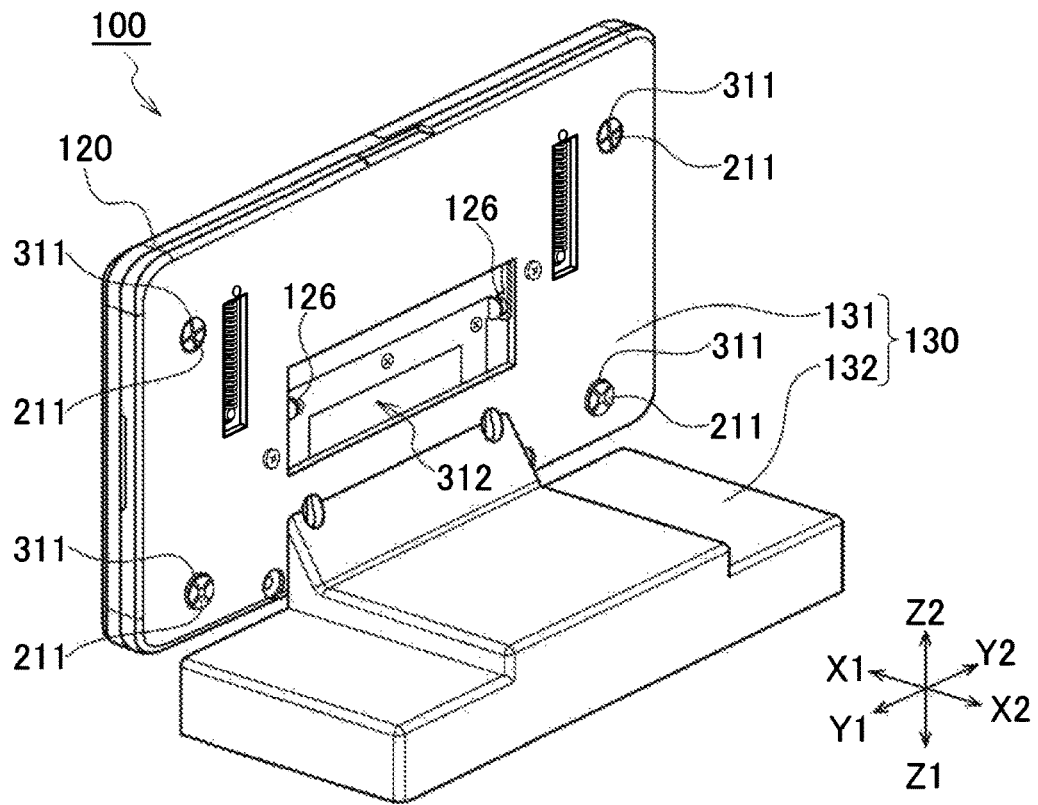
Figure 5A:
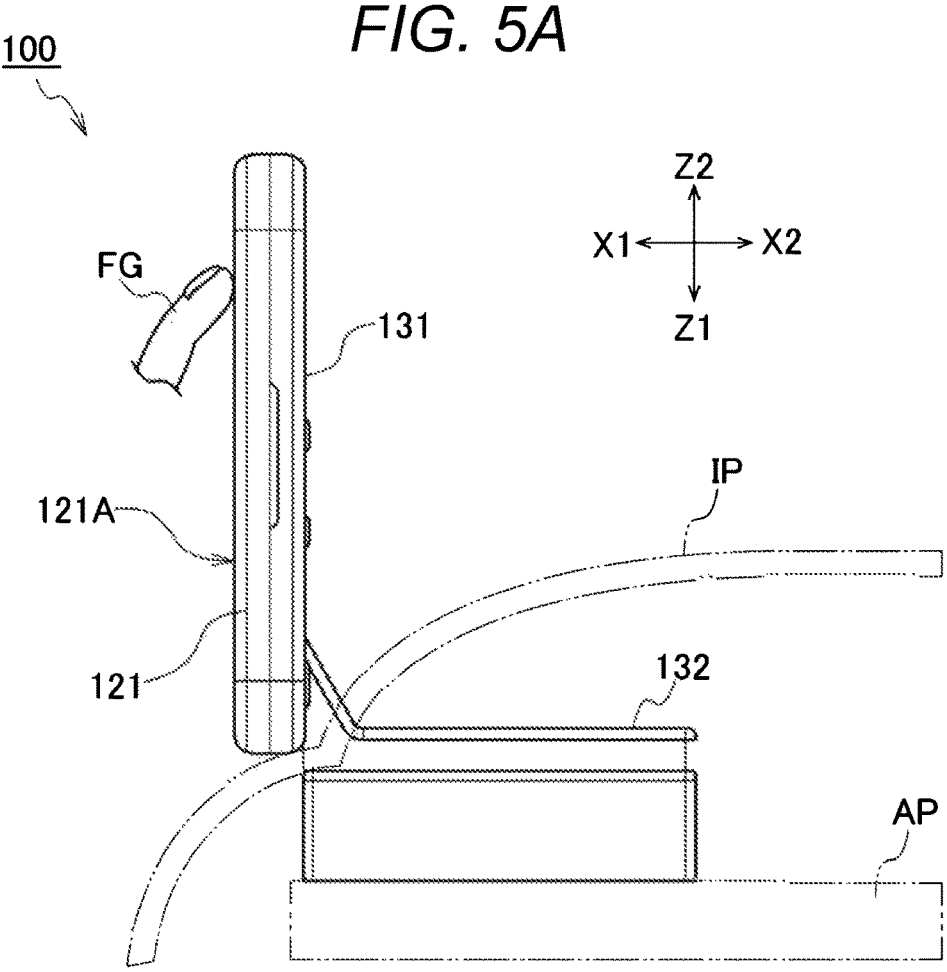
FIG. 5A is a side view of the input device with a vibration mechanism according to one embodiment of the present disclosure.
Figure 5B:
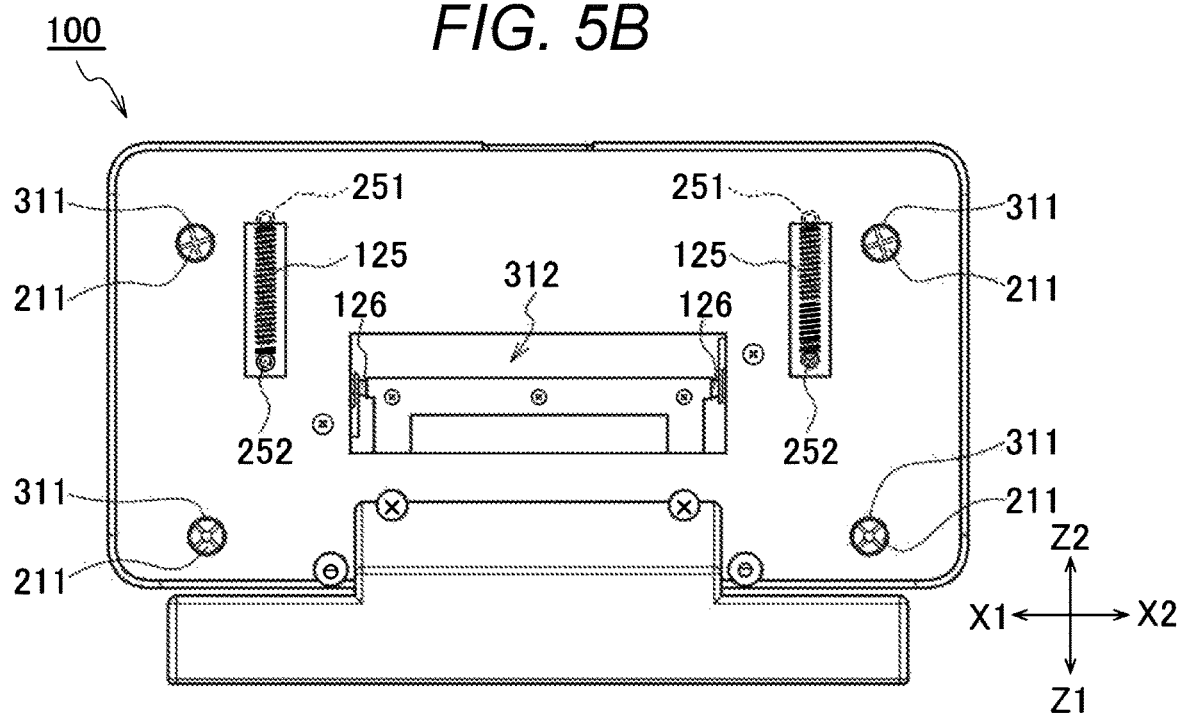
FIG. 5B is a rear view of the input device with a vibration mechanism according to one embodiment of the present disclosure.
Figure 6A:
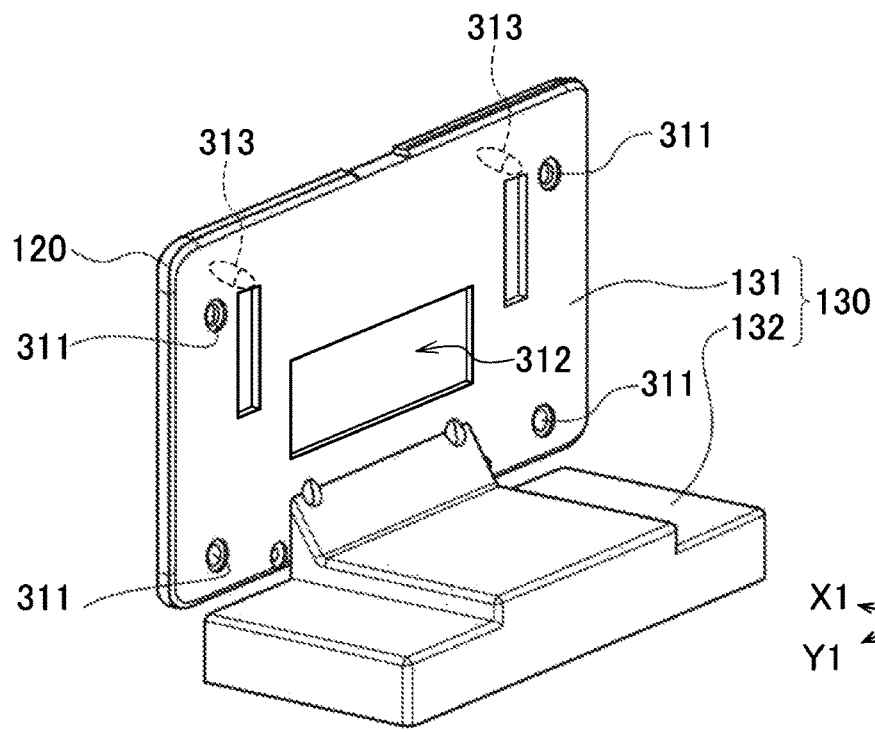
FIG. 6A is an external view for explaining a structure of a display chassis included in the input device with a vibration mechanism according to one embodiment of the present disclosure.
Figure 6A:
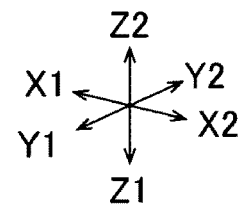
Figure 6B:
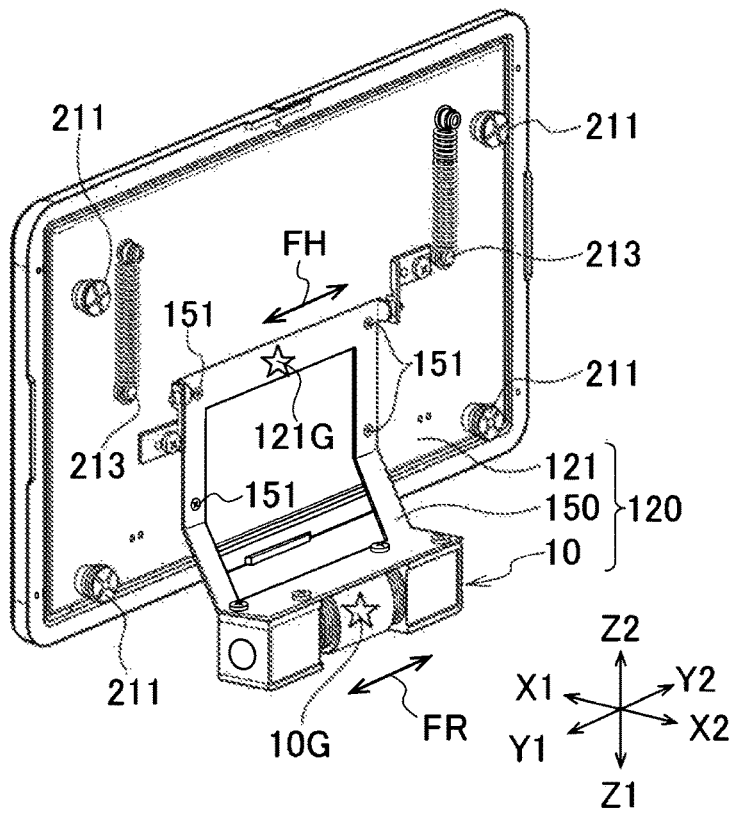
FIG. 6B is an external view for explaining a structure of a movable portion included in the input device with a vibration mechanism according to one embodiment of the present disclosure.
Figure 6C:
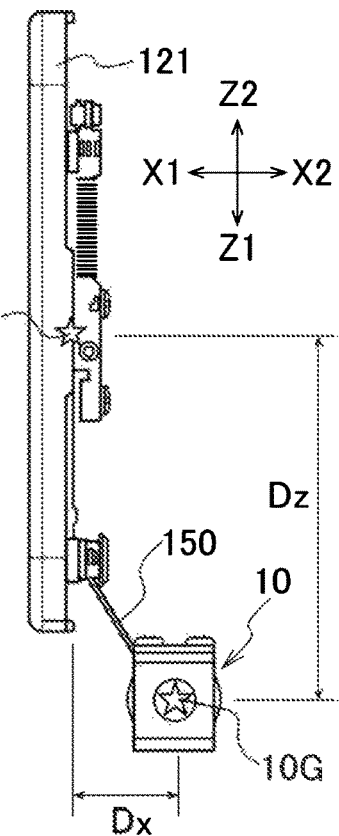
FIG. 6C is a side view for explaining a structure of the movable portion included in the input device with a vibration mechanism according to one embodiment of the present disclosure.

Hereinafter, an input device with a vibration mechanism provided with the vibration generation device 10 will be described with reference to the drawings. FIG. 4 is an external view of the input device with a vibration mechanism according to one embodiment of the present disclosure. FIG. 4A is an external view from a direction in which the operation surface can be visually recognized. FIG. 4B is an appearance view from a direction in which the back surface of the operation portion can be visually recognized. FIG. 5A is a side view of the input device with a vibration mechanism according to one embodiment of the present disclosure. FIG. 5B is a rear view of the input device with a vibration mechanism according to one embodiment of the present disclosure. FIG. 6A is an external view for explaining a structure of a display chassis included in the input device with a vibration mechanism according to one embodiment of the present disclosure. FIG. 6B is an external view for explaining a structure of a movable portion included in the input device with a vibration mechanism according to one embodiment of the present disclosure. FIG. 6C is a side view for explaining a structure of a movable portion included in the input device with a vibration mechanism according to one embodiment of the present disclosure.

As shown in FIGS. 4 to 6, an input device 100 with a vibration mechanism according to one embodiment of the present disclosure includes a movable portion 120 including an operation portion 121 having an operation surface 121A that allows an input operation by contact of an operation portion (for example, a finger FG) of an operator, and a display chassis 130 having a through hole 311 to be locked by a hinge 211 of the movable portion 120 and supporting the operation portion 121. The operation surface 121A is a surface on the X1-X2 direction X1 side of the operation portion 121 of the movable portion 120, and a touch panel (either an electrostatic type or a resistive type) (not shown) and a display device (a liquid crystal display device, an organic EL display device, and the like are exemplified) are disposed in the operation portion 121.

The display chassis 130 is an L-shaped member having a fixing portion 131 whose outer shape when viewed from the Y1-Y2 direction extends in a Z1-Z2 direction and a base portion 132 which is a portion extending in the X1-X2 direction. The fixing portion 131 is provided with the through hole 311 described above, and the operation portion 121 is supported by the through hole 311. The base portion 132 has a connecting portion (not shown) with an attachment object AP to which the input device 100 with a vibration mechanism such as a vehicle is to be attached. In FIG. 3, an exterior portion IP disposed so as to cover the attachment object AP and the base portion 132 is indicated by a two-dot chain line. When the attachment object AP is a part of the vehicle, the exterior portion IP is a part of an instrument panel or a dashboard. As described later, a bracket 150 connected to the operation portion 121 and the vibration generation device 10 further connected to the bracket 150 as a vibration generation unit are disposed inside the base portion 132. Accordingly, the base portion 132 prevents the vibration from the vibration generation device 10 to the operation portion 121 from being influenced by foreign matter or the like from the outside. The operation of the vibration generation device 10 is controlled by a control unit (not shown). For example, the control unit is disposed at a position that does not interfere with the operation of the vibration generation device 10 in the base portion 132.

As shown in FIG. 5B, as a member for restricting the range of change of the relative position of the operation portion 121 with respect to the fixing portion 131 of the display chassis 130, a support portion 125 is provided in the input device 100 with a vibration mechanism in addition to the hinge 211.

The support portion 125 is made of an elastic body that expands and contracts in the Z1-Z2 direction. Specifically, the support portion 125 is made of a coil spring, and is fixed to the display chassis 130 at an end portion 251 on a Z1-Z2 direction Z2 side, and an end portion 252 on a Z1-Z2 direction Z1 side supports a pin 213 of the operation portion 121. Therefore, the fixing portion 131 of the display chassis 130 hangs the movable portion 120 including the operation portion 121 in a free direction by the support portion 125. When a specific external force (including an exciting force by the vibration generation device 10) is not applied, the free direction is a vertical direction (Z1-Z2 direction).

A penetrating portion 312 is provided in the center portion of the fixing portion 131 of the display chassis 130 when viewed from the X1-X2 direction, and a vibration restricting damper mechanism 126 that restricts the range of change of the relative position in the Y1-Y2 direction between the operation portion 121 and the fixing portion 131 by using this penetrating portion 312, and restricts the swing width of the vibration in the Y1-Y2 direction transmitted to the operation portion 121 from the vibration generation device 10 is provided.

As shown in FIG. 6A and FIG. 6B, the fixing portion 131 of the display chassis 130 holds the movable portion 120 including the operation portion 121 in a vibratable manner by the through hole 311 through which the hinge 211 is inserted and a pin 313 to be locked by one end portion 251 of the support portion 125. Note that the hinge 211 has a bush made of an elastic body, and is in contact with the through hole 311 in the bush. As described above, the hinge 211 has the bush made of an elastic body, so that the operation portion 121 is held while vibrating within a predetermined range with respect to the fixing portion 131. When the support portion 125 is not provided, all of a vertical force based on the own weight of the operation portion 121 is applied to the bush of the hinge 211. However, by having the support portion 125, a part of the force in the vertical direction is applied to the support portion 125, so that the force to be applied to the bush can be reduced and the life of the bush can be prolonged.

As shown in FIG. 6B, one end side (Z1-Z2 direction Z2 side) of the frame-like bracket 150 as viewed from the X1-X2 direction is attached to the operation portion 121 of the movable portion 120 by means of an attachment screw 151. As shown in FIG. 6C, the bracket 150 has a bent shape in which one end extends in a Z1-Z2 direction Z2 direction and the other end extends in an X1-X2 direction X2 direction when viewed from the Y1-Y2 direction. Then, the vibration generation device 10 is attached to the other end side (X1-X2 direction X2 side).

Therefore, as shown in FIG. 6C, a vibration center 10G of the vibration generation device 10 is offset from a centroid 121G of the operation portion 121 by a distance Dx toward the X1-X2 direction X2 side and offset by a distance Dz toward the Z1-Z2 direction Z2 side. By disposing the vibration generation device 10 at a position offset with respect to the centroid 121G of the operation portion 121 as described above, without enlarging the outer shape of the operation portion 121, in particular, without increasing the thickness (X1-X2 direction length), without expanding the width (Y1-Y2 direction length), and without increasing the height (Z1-Z2 direction length), it is possible to dynamically connect the vibration generation device 10 having a large exciting force to the operation portion 121. Therefore, the input device 100 with a vibration mechanism having such a structure can appropriately respond to the demand for an increase in size and thickness. Note that in a case where the operation portion 121 is used in a vehicle-mounted application, particularly, is arranged to protrude from the instrument panel (exterior portion IP), if the vibration generation device 10 is disposed inside the base portion 132 of the display chassis 130 and the base portion 132 is disposed inside the instrument panel (exterior portion IP), the vibration generation device 10 is not visually recognized by the user. Therefore, this is preferable.

When using the input device 100 with a vibration mechanism, the vibration generation device 10 vibrates as described with reference to FIGS. 1 to 3 based on a control signal from a control unit (not shown). An exciting force FR due to the vibration of the vibration generation device 10 is transmitted to the operation portion 121 via the bracket 150 having a frame shape when viewed from the X1-X2 direction and having a bending portion when viewed from the Y1-Y2 direction, and becomes a translational force FH that causes the operation portion 121 to vibrate in the Y1-Y2 direction.

Although the present embodiment and application examples thereof have been described above, the present disclosure is not limited to these examples. For example, the first biasing portion 22 and the second biasing portion 23 of the plunger 20 of the vibration generation device 10 are arranged coaxially, but the present disclosure is not limited thereto. The moving axis of the first biasing portion 22 and the moving axis of the second biasing portion 23 may not be coaxial and may be disposed in parallel to each other.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teaching of the disclosure without departing from the central scope thereof. Therefore, it is intended that this invention not be limited to the particular embodiments disclosed, but that the invention will include all embodiments falling within the scope of the appended claims.

What is claimed is:

1. A vibration generation device comprising:
   a plunger; and,
   a solenoid; wherein:
   the plunger includes a weight portion, a first biasing portion extending from the weight portion along a first direction, and a second biasing portion extending from the weight portion along a second direction opposite to the first direction;
   the solenoid includes a first solenoid that is disposed so as to surround a part of the first biasing portion and operates the plunger in the first direction, and a second solenoid that is disposed so as to surround a part of the second biasing portion and operates the plunger in the second direction;
   the first solenoid and the second solenoid are disposed to be separated from each other in the first direction and the second direction;
   the first solenoid and the second solenoid have a fixing portion for a vibration target; and,
   the weight portion is provided between the first solenoid and the second solenoid in the first direction and the second direction and reciprocates between the first solenoid and the second solenoid to vibrate the vibration target.

2. The vibration generation device according to claim 1, further comprising:
   a first elastic member located between the first solenoid and the weight portion; and,
   a second elastic member located between the second solenoid and the weight portion;
   wherein the first solenoid cooperates with the second elastic member to move the plunger in the first direction, and the second solenoid cooperates with the first elastic member to move the plunger in the second direction.

3. The vibration generation device according to claim 2, wherein a natural frequency of a spring system by the first solenoid and the plunger and a natural frequency of a spring system by the second elastic member and the plunger are in harmony; and,
   wherein a natural frequency of a spring system by the second solenoid and the plunger and a natural frequency of a spring system by the first elastic member and the plunger are in harmony.

4. The vibration generation device according to claim 1, wherein a natural frequency of a spring system for moving the plunger in the first direction and a natural frequency of a spring system for moving the plunger in the second direction are preferably in harmony.

5. The vibration generation device according to claim 1, further comprising:
   a first damper portion provided between the first solenoid and the weight portion, and configured to alleviate movement of the plunger in the first direction; and,
   a second damper portion provided between the second solenoid and the weight portion, and configured to alleviate movement of the plunger in the second direction.

6. An input device with a vibration mechanism comprising:
   an operation portion capable of performing an input operation by an operator;
   a vibration generation unit that generates vibration with respect to the operation portion; and,
   a control unit that controls an operation of the vibration generation unit; wherein:
   the vibration generation unit includes the vibration generation device according to any one of claims 1 to 5; and,
   the operation portion is fixed to the first solenoid and the second solenoid of the vibration generation device.

7. The input device with a vibration mechanism according to claim 6, wherein the vibration generation unit is separated from the operation portion, and the vibration generation unit and the operation portion are fixed via a bracket.

8. A vibration generation device comprising:
   a plunger; and,
   a solenoid; wherein:
   the plunger includes a weight portion, a first biasing portion extending from the weight portion along a first direction, and a second biasing portion extending from the weight portion along a second direction opposite to the first direction;
   the solenoid includes a first solenoid that is disposed so as to surround a part of the first biasing portion and operates the plunger in the first direction, and a second solenoid that is disposed so as to surround a part of the second biasing portion and operates the plunger in the second direction;

the first solenoid and the second solenoid have a fixing portion for a vibration target; and, the weight portion reciprocates between the first solenoid and the second solenoid to vibrate the vibration target; and wherein, a first damper portion is provided between the first solenoid and the weight portion, and configured to alleviate movement of the plunger in the first direction; and, a second damper portion is provided between the second solenoid and the weight portion, and configured to alleviate movement of the plunger in the second direction.

9. The vibration generation device according to claim 8, further comprising:

a first elastic member located between the first solenoid and the weight portion; and, a second elastic member located between the second solenoid and the weight portion;

wherein the first solenoid cooperates with the second elastic member to move the plunger in the first direction, and the second solenoid cooperates with the first elastic member to move the plunger in the second direction.

10. The vibration generation device according to claim 9, wherein a natural frequency of a spring system by the first solenoid and the plunger and a natural frequency of a spring system by the second elastic member and the plunger are in harmony; and, wherein a natural frequency of a spring system by the second solenoid and the plunger and a natural frequency of a spring system by the first elastic member and the plunger are in harmony.

11. The vibration generation device according to claim 8, wherein a natural frequency of a spring system for moving the plunger in the first direction and a natural frequency of a spring system for moving the plunger in the second direction are preferably in harmony.

* * * * *